Figure 3:
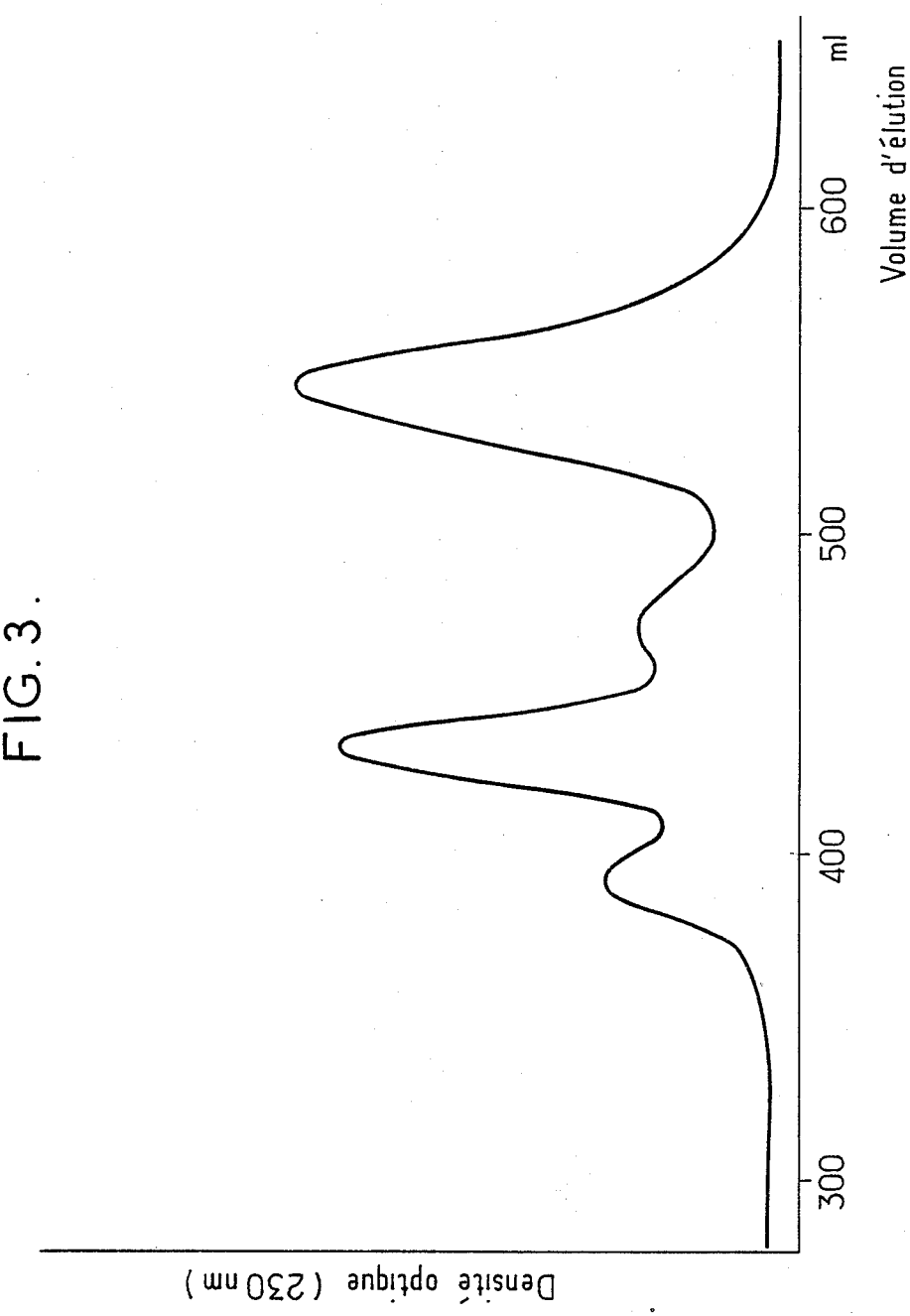

United States Patent [19]

Lormeau et al.

[11] Patent Number: 4,826,827
[45] Date of Patent: May 2, 1989

[54] SHORT CHAINED OLIGOSACCHARIDES HAVING BIOLOGICAL PROPERTIES, A PROCESS FOR MAKING THE SAME AND THE USE THEREOF AS DRUGS

[75] Inventors: Jean-Claude Lormeau, Maromme La Maine; Jean Choay; Maurice Petitou, both of Paris, all of France

[73] Assignee: Choay S.A., Paris, France

[21] Appl. No.: 851,892

[22] Filed: Mar. 21, 1986

Related U.S. Application Data

[63] Continuation of Ser. No. 373,016, Apr. 29, 1982, abandoned, which is a continuation-in-part of Ser. No. 194,544, Oct. 6, 1980, abandoned, which is a continuation-in-part of Ser. No. 91,164, Nov. 5, 1979, abandoned, which is a continuation-in-part of Ser. No. 204,505, Nov. 6, 1980, abandoned.

[30] Foreign Application Priority Data

Apr. 29, 1981 [FR] France .................................. 81 0604

[51] Int. Cl.$^4$ .................... A61K 31/725; C08B 37/10; C07H 3/10
[52] U.S. Cl. ........................................ 514/56; 536/21; 536/55
[58] Field of Search ................ 536/123, 55, 3, 21; 514/56

[56] References Cited

U.S. PATENT DOCUMENTS

| | | | |
|---|---|---|---|
| 3,506,642 | 4/1983 | Koh et al. | 536/21 |
| 3,985,871 | 10/1976 | Butte et al. | 424/183 |
| 4,122,250 | 10/1978 | Schmer | 536/21 |
| 4,175,182 | 11/1979 | Schmer | 536/21 |
| 4,213,962 | 7/1980 | Miura et al. | 424/183 |
| 4,281,108 | 7/1981 | Fussi | 536/21 |
| 4,401,662 | 8/1983 | Lormeau et al. | 514/56 |

FOREIGN PATENT DOCUMENTS

| | | | |
|---|---|---|---|
| 867064 | 5/1961 | United Kingdom | 536/21 |
| 2002406 | 8/1977 | United Kingdom | 536/21 |

Primary Examiner—Johnnie R. Brown
Assistant Examiner—John W. Rollins, Jr.
Attorney, Agent, or Firm—Weiser & Stapler

[57] ABSTRACT

Short chained ligosaccharides of high structural homogeneity constituted essentially by hexasaccharides of the formula:

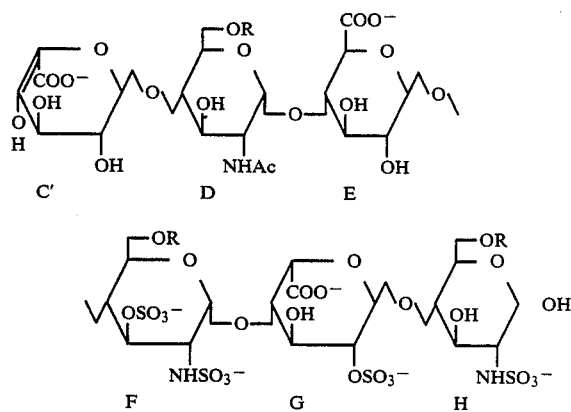

in which R represents a hydrogen atom or the $-SO_3^{31}$ group. These hexasaccharides have a highly selective activity on certain steps in blood coagulation and are useful as anti-thrombotic medicaments.

12 Claims, 3 Drawing Sheets

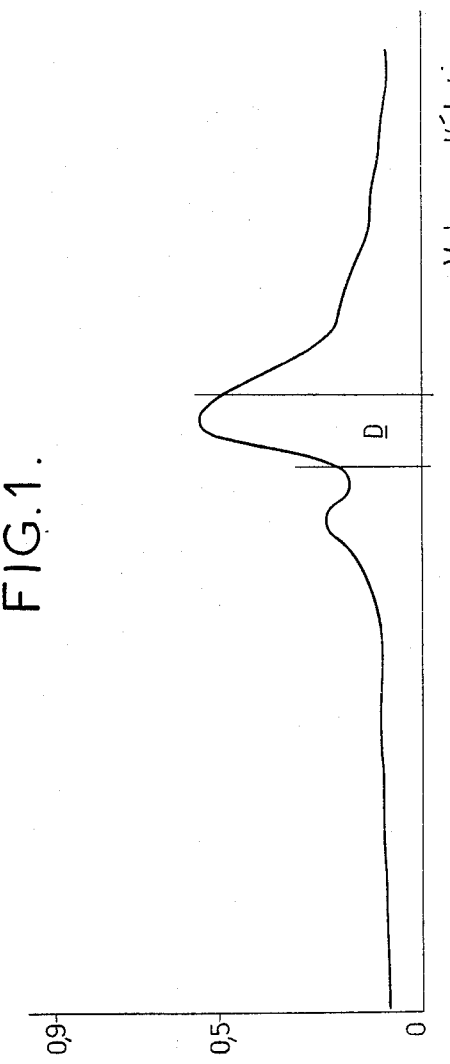
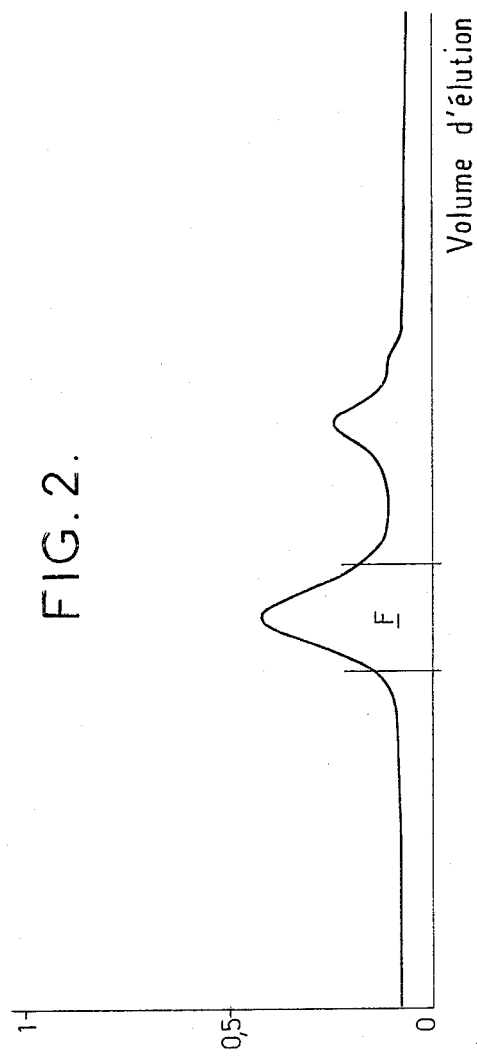

SHORT CHAINED OLIGOSACCHARIDES HAVING BIOLOGICAL PROPERTIES, A PROCESS FOR MAKING THE SAME AND THE USE THEREOF AS DRUGS

This application is a continuation of Ser. No. 373,016, filed Apr. 29, 1982, which is a continuation-in-part of patent application Ser. No. 194,544, filed Oct. 6, 1980, which in turn is a continuation-in-part of patent application Ser. No. 091,164, filed Nov. 5, 1979, which is a continuation-in-part of Ser. No. 204,505 filed Nov. 6, 1980, all now abandoned.

The invention relates to short chained oligosaccharides, having biological properties enabling them particularly to control only certain stages of blood coagulation.

It also relates to a process for obtaining the same and to their uses as active principles of drugs.

The inventors have already described oligosaccharides having biological properties of the type mentioned above.

When depolymerizing heparin by a chemical or an enzymatic route, the inventors have in particular obtained octasaccharides of great value corresponding to the sequence A-B-C-D-E-F-G-H (denoted by the abreviation A-H).

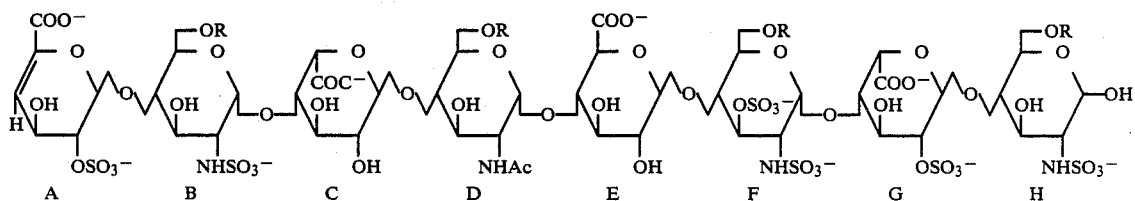

in which R represents a hydrogen atom or a $—SO_3^-$ group.

These octasaccharides are observed to be particularly valuable because of their high specificity with respect to the activated X factor or Xa factor of the blood (measured according to the Yin-Wessler test) whilst their activity on the total coagulation (measured according to the USP or APTT test) is very low.

The references regarding these tests are given in the Examples.

In pursuing their work in this field, the inventors were interested, particularly, in the production of oligosaccharides with shorter chains than these octasaccharides, but possessing however an advantageous ratio of their Yin-Wessler titer to their USP or APTT titer.

They have thus been led to observe that by operating under well-determined conditions, it was possible to selectively shorten the active chains of the A-H octasaccharides and to obtain compositions of high homogeneity in active oligosaccharides with short chains.

It is therefore an object of the invention to provide novel oligosaccharides with shorter chains than the octasaccharides, advantageously possessing at least the biological propertires of these octasaccharides.

It is another object of the invention to provide an easy practice enabling elimination highly selectively of the A-H octasaccharide units not taking part essentially in the the biological action concerned of these products.

It is still another object to provide means for obtaining an enzyme particularly suited to the practising of this process. It is also another object to provide active principles of drugs and the drugs themselves capable of inhibiting the Xa factor, when it is present in the blood, with a high degree of selectivity whist possessing very low activity on total coagulation, and useful, through this fact, for antithrombotic treatments without hemorragic risk for the patient.

The oligosaccharide compositions of high homogeneity according to the invention, are characterised in that they are formed essentially of hexasaccharides possessing the sequence C'DEFGH (denoted below by the abreviation C'-H).

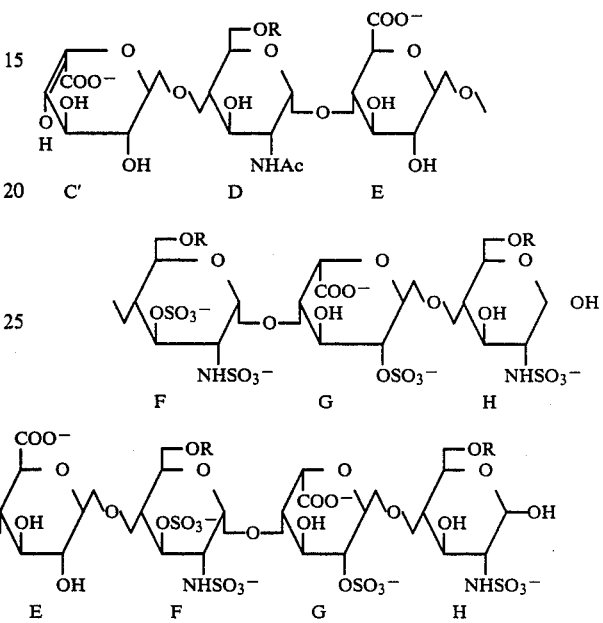

in which R represents a hydrogen atom or the group $—SO_3^-$.

The hexasaccharides of the invention are characterised by a high affinity for ATIII.

They are also, characterised by NMR spectra comprising, among others, a signal in the region of the carbon at the 2 position of the N-sulfate-glucosamine residues, which does not appear with heparin. This signal can be attributed to the presence of a substituent on the oxygen atom at the 3 position, and more particularly to a 3-0-sulfate group on an N-sulfate-D-glucosamine residue, (unit F of the diagram).

The hexasaccharides of the invention are, moreover, characterised by Yin-Wessler titers largely superior to those of heparin. More especially, hexasaccharide compositions of the invention may have Yin-Wessler titers, higher than 2000 u/mg, capable of attaining even about 2500 u/mg. Advantageously, their APTT or USP titer is observed to be particularly low, of the order of 10, which corresponds to compositions having ratios of their Yin-Wessler titer to their USP or APTT titer as high as 200, even about 250.

Advantageous hexasaccharides are formed from C'-H hexasaccharides in which at least one or two of the R groups represent a $—SO_3^-$ group.

The invention is also aimed at a process for obtaining the abovementioned hexasaccharide compositions.

According to this process, there are subjected, under predetermined conditions, A-H octasaccharides, possibly octasaccharide compositions formed to a major extent by these A-H octasaccharides, to the action of an enzyme.

Unexpectedly, it is observed that the A-H octasaccharides, which may be themselved obtained by the action of an enzyme on the heparin chains, are however still degradable by the enzymatic route. By operating under predetermined conditions, it is then possible to eliminate units not taking part essentially in the activity of these products, and this with a high specificity, which enables hexasaccharide compositions of great structural homogeneity to be obtained.

The process according to the invention is hence characterised in that the abovementioned A-H octasaccharides, or octasaccharide compositions formed to a large extent from these octasaccharides, having a high ratio of the Yin-Wessler titer to their APTT or USP titer, are contacted with an enzymatic agent under conditions adjusted so as to fragment these octasaccharides specifically in order to remove the A-B units not taking part essentially in the activity concerned, this specificity leading to the production of mixtures formed practically entirely of active hexasaccharides.

According to a feature of the invention, these conditions comprise advantageously the application of the enzyme at high concentrations of the order of 0.25 to 1 mg per mg of octasaccharides treated, preferably of the order of 0.5 mg of enzyme per mg of octasaccharide.

In order to provide hexasaccharide compositions highly homogeneous in C'-H hexasaccharides, recourse is advantageously had to a treatment enabling the separation from the degradation mixture of at least the major portion of the C'-H active hexasaccharides.

A suitable treatment comprises a fractionation carried out in order to remove the proteins resulting from the enzymatic reaction and the unreacted reagents. This fractionation may be carried out, for example, by gel permeation according to the molecular weight and/or the ionic density of the products.

In a preferred embodiment of the invention, the A-H octasaccharide is subjected to the action of an enzyme.

As a suitable enzyme for obtaining selective removal of the AB units of the A-H octasaccharide, recourse is advantageously had to heparinase, more specifically a heparinase of bacterial origin.

Such a heparinase is advantageously of the type of heparinases which can be obtained from *Flavobacterium heparinum* bacteria.

For the satisfactory practising of the process of the invention for obtaining C'-H hexasaccharides, recourse is more especially had to a heparinase such as obtained according to a process including steps, notably of cultivating bacteria of *Flavobacterium heparinum* from the extraction of crude heparinase from these bacteria, and purifications, carried out so as to obtain a purified heparinase, having sufficiently high activity to effect the desired removal of the A-B units with satisfactory yields.

Advantageously, the heparinase applied possesses a heparinasic activity of at least about 90 000 units, preferably higher than 100,000 units, particularly of the order of 110,000 to 140,000 units.

The activity of the enzyme is evaluated, with respect to the increase in the absorption of a heparin titrating at least 215 iu/mg at 230 nm.

By units, is then meant, in the description and the claims, the amount of enzymes which results in the appearance of an increase of one thousanth of an optical density unit per minute.

As already indicated, 0.25 to 1 mg of enzyme (having an activity of the order of at least 90 000 units) was employed per mg of octasaccharide preferably about 0.5 mg of enzyme.

Study of the action of the enzyme on the octasaccharide has shown that it was appropriate to work at a temperature above room temperature, particularly between 35° and 40° C., preferably of the order of 37° C.

Under these conditions, a total duration of about 24 hours appeared satisfactory.

Advantageously, the operation is carried out in a buffer medium, preferably of a pH of the order of 6 to 8, in particular close to neutrality.

Taking into account the moderate stability of the enzyme, it is preferable, in order to increase its efficacity, to add it portion by portion, particularly at regular intervals during this lapse of time.

It will be noted that, advantageously, the process of the invention uses a starting product, namely the A-H octasaccharide of high quality:homogeneous, and highly specific.

Under the conditions developed by the inventors, this octasaccharide is hence observed to be degradable and this, selectively, leading to shorter chains preserving the sequence responsible for the activity of these products and hence possessing advantageously biological properties at least as great, even greater than those of the octasaccharide.

Preferably, the process of the invention is applied with a heparinase obtained by induction from *Flavobacterium heparinum* bacteria, extraction of the crude heparinase from the bacteria, fractionation of the crude heparinase extract obtained followed by several purifications of the fractions possessing the desired heparinasic activity.

The preparation of heparinase is effected from a *Flavobacterium heparinum* culture made under the conditions described by Payza et Coll. (J. Biol. Chem. 1956, 223, p. 853–858).

By operating at a temperature close to room temperature, with aeration and average stirring, a culture period of the order of 25 to 30 hours appeared satisfactory.

Bacteria were then recovered from the culture medium, for example, by centrifugation, preferably carried out at low temperature, particularly below 10° C., preferably of the order of 4° C.

Before extracting the heparinase, it is advantageous to resuspend the bacteria, then after having subjected them to a dispersing operation, to lyophilise them.

The bacteria were then subjected to a treatment with a view to the extraction of the heparinase. This treatment advantageously comprises grinding then their recovery for example, by centrifugation.

In order to obtain satisfactory extraction, it was convenient to carry out several grindings, for example, firstly in the dry and then in a buffer medium of pH of the order of 6 to 8, advantageously 7 or close to 7.

The crude heparinase extract recovered by centrifugation was then subjected, for purification purposes, to a fractionation step. To provide a heparinase possessing the desired activity and properties, additional operations of purification of the successively obtained fractions advantageously followed. Study of these fractionation and purification processes has shown that it was preferable to operate at a temperature below room temperature, particularly below 10° C., preferably of about +4° C.

The fractionation step is advantageously carried out particularly according to an exclusion chromatographic process by means of DEAE cellulose, in the presence of ammonium sulfate.

In a first batch step, the DEAE cellulose is advantageously used in the proportion of about at least 3 g per g of bacterial cells, preferably of about 5 g.

The DEAE cellulose is advantageously equilibrated previously by means of a buffer of pH of the order of 6 to 8, preferably of about 7.

The ammonium sulfate is utilized in the proportion of about at least 3 g/l, preferably of about 6 g/l.

The suspension thus formed is filtered and the filtrate is collected, supplemented advantageously with rinsing solutions from the DEAE cellulose. In a second step, the previously obtained solution is subjected to an additional fractionation by means of DEAE cellulose, advantageously preequilibrated by means of the previously used buffer. This step is carried out with advantage by chromatography in a column, the filtrates being percolated at a rate of about 40 to 60 ml/h.

From the effluent, the heparinase was recovered, for example, by precipitation, particularly by means of ammonium sulfate.

The heparinase obtained at the conclusion of this fractionation operation which, under the particular conditions reported above, occurs in the form of a sulfoammoniacal precipitate, is then advantageously purified by a process including at least one placing in contact with an agarose of the Sepharose type, more especially that known under the name CM Sepharose CL 6B, followed by contacting the collected purified fractions with heparinasic activity, with an agarose of the type marketed under the name ULTRAGEL ACA 54.

The purification step by means of an agarose of the CM Sepharose CL 6 B type is advantageously carried out in a chromatographic column.

It appears desirable to dissolve the heparinase (which occurs in the form of a sulfoammoniacal precipitate), in distilled water, so as to obtain a solution having a conductivity of the order of 6000 micromhos and to adjust its pH to about 6.

The agarose applied is advantageously equilibrated previously by means of a buffer of pH of the order of 5 to 7, preferably close to 6.

After having washed the column preferably by means of the washing buffer, the chromatography of the heparinase solution is carried out and the heparinase is recovered by elution by a linear gradient obtained with the buffer used for washing and this same buffer is brought to a higher ionic strength.

The fractions possessing the desired heparinasic activity are recovered to collect the heparinase they contain. For example, a precipitation particularly by means of ammonium sulfate is carried out, followed by centrifugation.

As already indicated, it is advantageous to proceed with an additional purification of the heparinase collected by operating once again a placing in contact with agarose, preferably, an agarose such as ULTROGEL ACA 54. This operation is, preferably carried out in a column equilibrated by means of a buffer of pH of the order of 6 to 8, particularly of the order of 7.

This buffer is advantageously used to develop the column.

In this way fractions with a high heparinasic activity were recovered.

As already described by the inventors, the A-H octasaccharide employed in the process of the invention can be obtained by contacting the heparin (or heparinic fractions) possessing anticoagulant activity and chains having a molecular weight of the order of about 2000 to 50,000, with an enzymatic agent, preferably a purified heparinase, more especially, of bacterial origin possessing an activity of the order of 45,000 units, it being understood that the assay is carried out with a heparin titrating at least 215 iu/mg. The conditions used for carrying out this step are adjusted so as to obtain a depolymerisation mixture containing octasaccharide chains having an anti-Xa activity (Yin-Wessler) and comprising a sequence responsable for the specific anti-Xa activity of these products.

The enzyme causes the cleavage of the heparinic chains between the anomeric carbon of the N-sulfate-glucosamine residue and the following uronic acid unit.

The biologically active octasaccharides are then separated from the depolymerisation mixture by adsorption on antithrombin III (ATIII) fixed to a support such as agarose, under conditions enabling the octasaccharides having an affinity for the ATIII to be fixed or retained on the ATIII.

This step is advantageously followed by the elution of the retained or adsorbed products in order to recover them and by their fractionation, for example by gel filtration in order to isolate them.

These oligosaccharides appear capable of exerting a powerful antithrombotic activity. By reason of their low and even practically zero anticoagulant activity, the risks of hemorrhage are advantageously practically eliminated. It has been moreover observed that this type of oligosaccharide does not cause any reactivity of the blood platelets.

The short chain hexasaccharides of the invention are devoid of toxicity. Administration of 10,000 u/kg (Yin-Wessler titer) of C'-H does not cause any toxic reaction in the rabbit, nor pyrogenic effect in the pyrogenicity test in the rabbit according to the French Pharmacopoea.

Administration to mice of doses as large as 3200 mg/kg has not permitted the determination of the $LD_{50}$.

The invention hence relates to pharmaceutical preparations which include said hexasaccharides with high anti-Xa activity.

It relates more particularly to pharmaceutical preparations devoid of pyrogenic substances containing an effective amount of active principle in associating with pharmaceutical excipients.

It relates also to compositions in which the pharmaceutical vehicle is suitable for administration by the oral route. Suitable administrative forms of the invention for administration by the oral route can be advantageously gastroresistant capsules, pellets or tablets, pills, or again in the form of liposomes.

Other pharmaceutical compositions comprise these oligosaccharides in association with suitable excipients for administration by the rectal route. Corresponding administrative forms are constituted by suppositories.

Other administrative forms of the invention are constituted by aerosols or pomades.

The invention also relates to injectable, sterile or sterilisable pharmaceutical compositions.

These solutions advantgeously contain 1000 to 100,000 u (Yin-Wessler)/ml of oligosaccharides, preferably from 5000 to 50,000, for example 25,000 u/ml, when these solutions are intended for injection subcutaneously. They can contain, for example, from 500 to 10,000, particularly 5000 u/ml of oligosaccharides when they are intended for injection intraveneously or by perfusion.

Advantageously, such pharmaceutical preparations are offered in the form of non-recoverable syringes, ready for use.

The invention also relates to pharmaceutical compositions containing said oligosaccharides in association with another active principle, useful in particular for prophylaxis and treatment of thrombosis, such as a venotonic agent such as dihydroergotamine, a nicotinic acid salt or a thrombolytic agent like urokinase.

The short-chain oligosaccharides of the invention are advantageously in the form of salts of at least one physiologically acceptable metal such as sodium and/or calcium and/or magnesium.

The pharmaceutical compositions of the invention are particularly adapted for the control (preventive or curative) of certain steps in the coagulation of the blood in man or in the animal, particularly in the case where the patient is subjected to risks of hypercoagulability resulting from a disturbance in the intrinsic phase, for example consequent upon a release by the organism of thromboplastins, for example, tissular thromboplastins, (surgical operations, atheromateous processes, development of tumours and disorders of coagulation by bacterial or enzymatic activators, etc.).

In order to illustrate the invention, there is indicated, below, an example of the dosage usable in man: this posology comprises, for example, the administration to the patient of 1000 to 25,000 u (Yin and Wessler) subcutaneously, twice or three times daily, according to the degree of hypercoagulability risk or the thrombotic condition of the patient, or from 1000 to 25,000 u/24 hours intraveneously, in discontinuous administrations at regular intervals, or continuously by perfusion, or again from 1000 to 25,000 u (three times weekly) intramuscularly or subcutaneously (these titers are expressed in Yin-Wessler units). These doses may naturally be adjusted for each patient according to the results and blood analyses carried out previously, the nature of the disease from which he suffers, and, generally, his state of health.

The invention also relates to the use of the oligosaccharides of the invention and of fractions containing them, to the constitution of biological reagents, useful in the laboratory, particularly as comparison elements for the study of other substances whose anticoagulant activity it is desired to test, particularly at the level of inhibition of the Xa factor.

It is directed also at the use of the fractions and oligosaccharides in nuclear medecine, as radiopharmaceutical products. The oligosaccharides and the fractions defined above are labelled by tracers selected from among those currently used in this field, and particularly by means of technetium 99 m.

For this purpose, the technetium 99 m obtained from commercial generators, in the form of unreactive sodium pertechnetate of valency 7 is converted into a reduced technetium of valency 4 which would be the most reactive form of technetium. This conversion is carried out by means of a reducing system effected from tin salts (stannous chloride), iron salts (ferrous sulfate), titanium salts (titanium trichloride) or other salts.

Most of the time, this mere reduction of the technetium is enough to fix the technetium to the molecule concerned under given conditions of pH.

It is possible to use the products of the invention, which constitutes in a way a support, at doses of the order of 100 to 200 iu Yin-Wessler.

For developing these radiopharmaceutical reagents, it is possible to operate in accordance with the method of P. V. KULKARNI et al. in The Journal of Nuclear Medecine 21, No. 2, p. 177–121.

The so-labelled products are advantageously used in in vivo tests for the detection and diagnosis of extended thromboses and thrombotic conditions.

EXAMPLE 1

Process for producing active C'-H hexasaccharides by the action of heparinase on A-H octasaccharide This process includes the following three steps 1 to 3:
(1) the preparation of the heparinase;
(2) the action of the heparinase on the A-H octasaccharide for the purposes of selective degradation, followed by
(3) fractionation of the degradation mixture by filtration on gel, and recovery of the fractions containing the desired hexasaccharides.

These steps are carried out as follows:

(1) Preparation of the heparinase

Enzymes derived from the cultivation of *Flavobacterium heparinum* obtained by the following procedure were used:

In an 18 liter fermenter, of the type marketed under the trademark BIOLAFFITE, the cultivation of *Flavobacterium heparinum* ATCC 13125 was carried out, for 26 hours in a culture broth corresponding to the following composition (in grams per liter of distilled water).

| | |
|---|---|
| Flavobacterium heparinum culture broth which has reached the stationary phase: | 500 ml |
| Monosodium sodium phosphate: | 2.5 |
| Disodium sodium phosphate: | 25 |
| Ammonium sulfate: | 1 |
| K Cl: | 0.1 |
| Sodium heparinate of titer equal or greater than 150 iu/mg of Codex quality: | 3 |
| Calcium chloride: | 0.01 |
| Ferric chloride: | 0.01 |
| Magnesium sulfate: | 0.01 |
| Manganese chloride: | 0.01 |
| Sodium molybdate: | 0.01 |

The pH of the broth was finally adjusted to 7.0 with phosphoric acid or soda.

This culture was carried out at a temperature of +24° C. with aeration and medium stirring.

After 26 hours of cultivation, the medium was cooled to +4° C. in a time interval of about 2 hours. The bacteria were recovered by centrifugation at 50,000 rpm, on a centrifuge of the type of the SHARPLESS pneumatic type T 313 A type and this for 2 hours. The centrifugation culot was taken up again in 1 liter cold distilled water, subjected to dispersion by an ULTRA-TURAX turbine at maximum speed for 5 minutes, then freeze-dried. The total duration of this operation was about 36 hours. Under these conditions, 4.1 grams of cells were obtained.

Extraction of the cells

The lyophilised cells, obtained by the preceding step, were vigorously ground dry, in a mortar, in the presence of 2 g of calcined alumine, for 1 hour. 10 ml of buffer 1 was then added (0.1M sodium acetate buffer, pH 7). The grinding in the mortar of the paste then obtained is continued for 30 minutes at +4° C. 450 ml of buffer was then added cold and the whole was allowed to stand with stirring for 1 hour at +4° C. The suspension obtained was centrifuged on a centrifuge of the SORVALL RC2 B, type, at 18,000 rpm at +4° C., for 20 minutes. The centrifugation culots composed of alumina and cell debris were discarded. The supernatant liquor (orange yellow and viscous) was collected, which constituted the crude cell extract, and corresponds to a volume of 470 ml. The rest of the manipulations were carried out at +4° C.

γ—Exclusion chromatography by DEAE cellulose

With stirring, at +4° C., 2.82 g of ammonium sulfate was added to the previously obtained supernatent liquor, and then 21 g of DEAE cellulose previously equilibrated with buffer (2) (0.1M sodium acetate buffer, pH 7 containing 6 g/l of ammonium sulfate). The whole was subjected to stirring for 2 hours at +4° C. with control and adjustment if necessary of the pH 7.0. Then the DEAE cellulose was separated by filtration on a Buchner funnel and it was washed in the cold with buffer (2), until the absence of proteins in the wash solutions. The whole filtrate and wash solutions (680 ml) were paused over a column of 400 ml (23=5 cm) of DEAE cellulose preequilibrated in buffer (2), at +4° C., at the flow rate of 50 ml/h. The column was finally rinsed with buffer 2), until the absence of protein in the rinse solutions. The column effluents and the rinse solutions were combined, which corresponds to a volume of 1100 ml and 715 g of ammonium sulfate was added with stirring. The precipitated proteins were collected by centrifugation at 7000 rpm and this for 30 minutes, on a centrifuge of the SORVALL type. 2.5 g of very wet precipitate which constitutes the heparinase was collected. This precipitate can be stored at −20° C. for several weeks.

ε—Chromatography on CM Sepharose CL 6 B

The previously obtained sulfoammonical precipitate was dissolved in cold distilled water used in a sufficient amount to obtain a final conductivity of 6000 micromhos. The pH of the solution obtained was adjusted to 6.0 by acetic acid or 2N soda. The final volume was 440 ml. The solution was then percolated at +4° C. over a column of 70 ml (15×2.6 cm) of CM Sepharose CL 6 B previously equilibrated with buffer (3) (0.1M sodium acetate buffer, 0.22M NaCl, pH 6.0), at a flow rate of 25 ml/h. The column was rinsed by buffer (3) until the absence of proteins in the effluent. The column effluents were discarded.

The heparinase was then eluted at 60 ml/h by means of a linear gradient formed from 600 ml of buffer (3) and 600 ml of buffer (3) adjusted to 0.34M NaCl.

The proteins emerging from the column were detected by continuous recording of the optical density (O.D.) at 280 nm and the eluate was collected by fractions of 5 ml by means of a fraction collector.

In FIG. 1, is shown the elution graph obtained by recording the O.D. at 280 nm of the column effluent.

The heparinase activity of each fraction was assayed. The fractions 45 to 48 (portion D of the graph) with a high heparinase content were grouped. These fractions correspond to a volume of 45 ml.

The proteins were precipitated by the addition of 30 g of ammonium sulfate and they were recovered by centrifugation at +4° C. at 15,000 rpm, for 10 minutes.

Gel filtration on ULTROGEL ACA 54

The centrifugation culot previously obtained was dissolved in cold distilled water and a final volume of 5 ml was obtained. This solution was placed at the top of a column (1 m×26 mm) of ULTROGEL ACA 54 equilibrated with 0.1M of sodium acetate buffer, 0.33M NaCl, pH 7. The column was developed by this same buffer at a flow rate 15 ml per hour. As previously the proteins emerging from the column were detected at 280 nm, and the column effluent was collected by fractions of 5 ml. The elution graph is shown in FIG. 2. The heparinase activity of each fraction was assayed. The fraction 32 to 37 (portion F of the graph), which contained the heparinase activity, were grouped together, which corresponds to a volume of 60 ml. This solution contains 7 mg of purified heparinase, having an activity of the order to 100,000 to 110,000 units/mg. (There was taken as an enzyme unit, the amount of enzyme which causes the appearance at 231 nm, of one thousandth of an optical density unit per minute when the heparinase is contacted at 38° C. with heparin titrating at least 215 iu/mg 0.065% in 0.125M tris-HCl buffer, pH 7, into which calcium chloride $CaCl_2$ is added).

The solution obtained is preserved and frozen at −20° C.

(2) Degradation of the octasaccharide by the heparinase 10 mg of A-H octasaccharide (batch BC IV 135), obtained according to the process described in Patent Application filed by Applicant in Great Britain on July 2, 1980, No. 80/21749, having an anti-Xa (Yin-Wessler) activity of 2100 u/mg, was dissolved in 10 ml of 0.1M sodium acetate buffer calcium chloride, pH 7.2.

The solution was incubated at +37° C. The heparinase addition was carried out as follows.

At time t=0, 17 ml of the heparinase solution previously obtained (namely 2 mg of heparinase) was added: at time t1=8 hours, 17 ml of heparinase solution was again added: at time t2=16 hours, there was added finally 8.5 ml of heparinase solution. At time t3=24 hours, the evaporation to dryness under vacuum at 40° C. of 52.5 ml of solution followed in an apparatus of the Rotavapor BUCHI type.

(3) Fractionation of the degradation mixture by filtration on gel

The mixture obtained on emerging from the degradation step was placed at the top of a superfine Sephadex G-50 column (200×2.5 cm). Elution of the products followed by means of 0.2M sodium chloride. The products were detected by their absorption at 230 nm. In FIG. 3 is shown the elution diagram obtained. Three principle fractions are distinguished. The first is constituted by undegraded starting material (4 mg), the second contains the desired hexasaccharides (7 mg) and the third disaccharides. A less important fraction is also distinguished in the region of tetrasaccharides between the peaks of the hexa and of the disaccharides.

The hexasaccharide fractions are collected together, the salts were removed and they were freeze-dried.

Study of the structure of the hexasaccharides of the fractions collected

A study of the structure of these fractions by colorimetric analysis of the fragments obtained by degradation by means of nitrous acid followed by gel filtration, ensued. The degradation, by means of nitrous acid, was carried out according to the method of SHIVELY and CONRAD described in Biochemistry, vol. 15 No. 12, 1976, 0. 3932 to 3942.

The action of nitrous acid is manifested by severance of the glycoside bonds between the N-sulfate-glucosamine units and the following uronic acid and converts the sulfate-glucosamine units into 2,5-anhydromannose residues.

Figure 4:
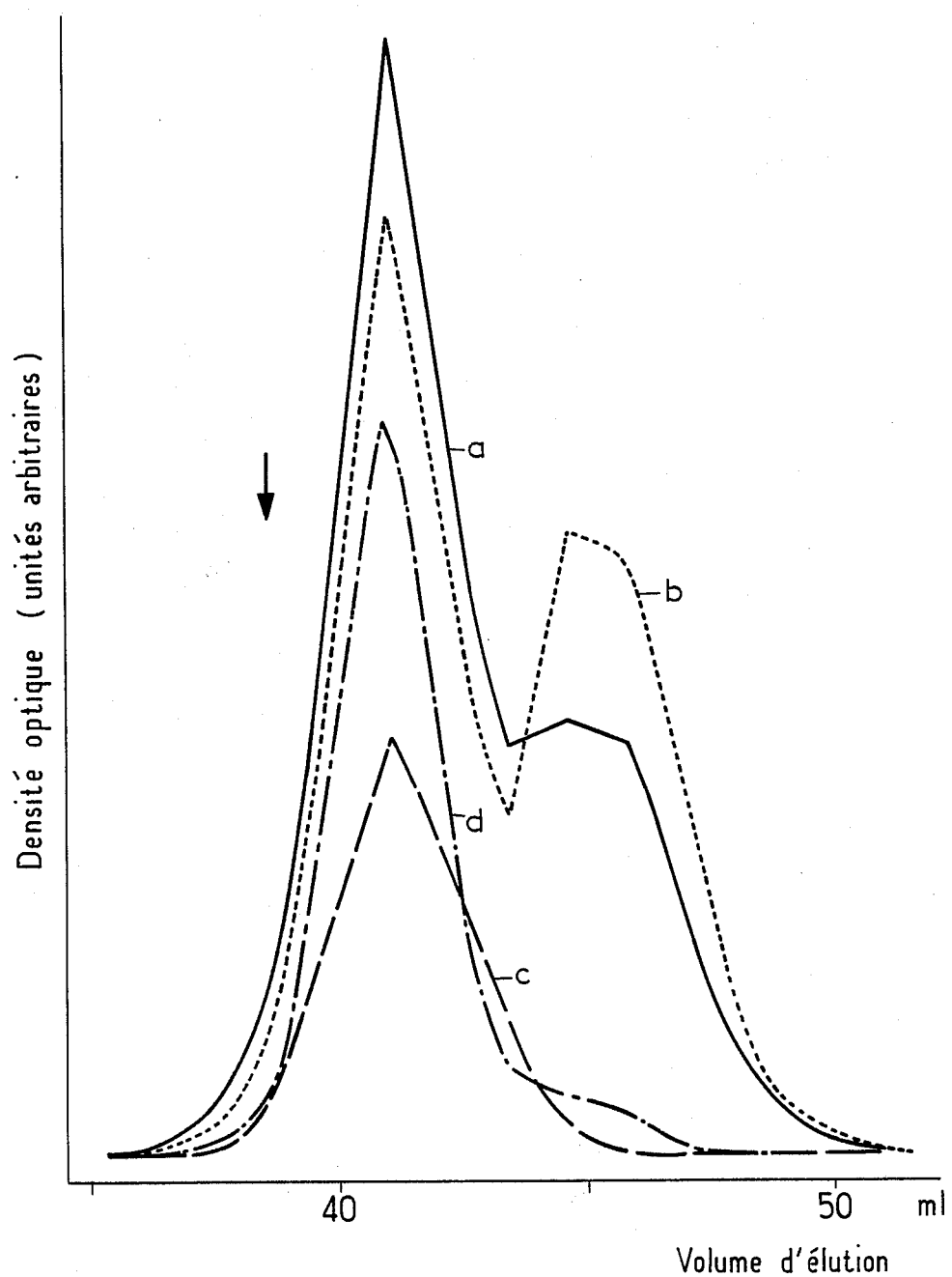

The hexasaccharide was then converted into tetrasaccharide and into disaccharide. These two oligosaccharides were separated filtration on a column of Superfine G-50 Sephadex (200×0.6 cm), eluted with 0.2M sodium chloride. In FIG. 4, are plotted the values of the optical density measured at 230 nm, of the eluted fractions (curve a in continuous lines) as well as their content of 2.5 nahydromannose groups (curve b in dotted lines . . . ), uronic acids (curve c in dashed lines - - - ) and N-acetyl-glucosamine (curve d in dashed - dotted lines -. -. -. ) (for determination of this latter group, measurements were carried out before and after acid hydrolysis, the difference obtained corresponding to the content of N-acetyl-glucosamine groups).

It is to be seen on examining FIG. 4 (the arrow in FIG. 4 indicates the elution volume for the original hexasaccharide) that the unsaturated uronic acid units which absorb the light at 230 nm are contained in the tetrasaccharide fraction whilst the disaccharide fraction is practically entirely devoid of such compounds.

In the same way, it appears that the N-acetyl-glucosamine groups are only present, as anticipated, in the tetrasaccharide fraction.

The content of uronic acid groups appears twice as high in the tetrasaccharide fraction as in the disaccharide fraction.

It is observed, also, that the 2,5-anhydromannose groups are present in equivalent manner in the two fractions, which implies that the disaccharides and the tetrasaccharides are obtained in a molar ratio 1/1. These results show that a cleavage has been effected on the hexasaccharide, giving rise to the disaccharide not bearing a double bond and the tetrasaccharide (cleavage between F and G).

In addition, these results establish that the hexasaccharide fraction is almost exclusively constituted by a single species which carries an N-sulfate-glucosamine unit at its reducing end, and an unsaturated uronic acid unit at its non-reducing end.

Comparison with the starting octasaccharide structure permits the conclusion that two other glucosamine units of which one is N-acetylated and the other N-sulfated-3-0-sulfated, and two other uronic acid residues (one glucuronic and one iduronic-2-O-sulfated) complete the hexasaccharide sequence.

Study of the vitro and in vivo biological activity of the hexasaccharide fraction obtained according to the above-described process The anti-Xa activity was determined by the Yin-Wessler test described by its authors in J. Lab. Clin. Med. 1976, 81, 298–300.

The overall anticoagulant activity was measured by the USP test or the APTT method.

The USP test is described in "Pharmacopea of the United States of America", XIX, pages 229–230 (see also the second supplement USP-NF, page 62, and the fourth supplement USP, page 90, respectively intitled "Drug substances" and "Dosage forms").

The APTT titer is measured by the method of J. CAIN et al. in "Hemostase, expansion scientific francaise", Paris, 1968, pages 133–135.

The in vivo antithrombotic activity was studied by using the method of Wessler et al. described in J. of appl. physiol. 1959, 14, 943–946, using a different thrombogenic stimulant.

Anti-Xa activity (Yin-Wessler): 2400 u/mg.

USP titer or APTT titer less than 10 u/mg.

The activity of this hexasaccharide fraction was studied in vivo in the rabbit according to the Wessler model. The administration of 250 u anti-Xa per kg before administration of 25 u/kg of a thrombogenic complex (concentrated prothrombin complex solid under the name Konyn by Cutter Laboratories, U.S.A.), prevents the formation of a thrombus.

We claim:

1. The hexasaccharide fraction consisting essentially of

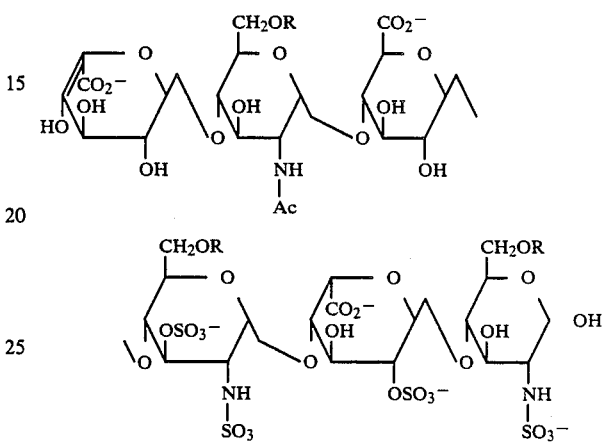

wherein R is hydrogen or $SO_3$ and the physiologically acceptable salts thereof.

2. The hexasaccharide fraction of claim 1 wherein at least one of the R substituents is an $-SO_3$ group.

3. The hexasaccharide fraction of claim 1 wherein at least one of the R substituents is hydrogen.

4. The hexasaccharide fraction of claim 1 wherein the salts are selected from the group consisting of sodium, calcium and magnesium.

5. An antithrombotic composition which has improved antithrombotic activity as compared to heparin and improved specificity with respect to the activated Xa factor of blood as measured by the Yin-Wessler test as compared to heparin and having a lower activity on total coagulation than heparin as measured by the USP or APTT test, which composition comprises a biologically acceptable carrier and an antithrombotically effective amount of the hexasaccharide fraction of claim 4, 1, 2 or 3.

6. The antithrombotic composition of claim 5 which has a Yin-Wessler titer higher than 2,000 u/mg.

7. The antithrombotic composition of claim 6 wherein the Yin-Wessler titer is higher than 2,500 u/mg.

8. The antithrombotic composition of claim 5 wherein the APTT or USP titer is about 10.

9. The antithrombotic composition of claim 5 in which the Yin-Wessler and USP and APTT titers are in the ratio of about 200.

10. The antithrombotic composition of claim 9 in which the Yin-Wessler and USP and APTT titers are in the ratio of about 250.

11. The antithrombotic composition of claim 5 which is an injectable liquid having a Yin-Wessler activity from about 1000 to 100,000 units per ml of hexasaccharide.

12. The antithrombotic composition of claim 11 wherein the activity of the solution is within the following two ranges: 5,000 to 50,000 and 500 to 10,000 units per ml.

* * * * *

UNITED STATES PATENT AND TRADEMARK OFFICE
CERTIFICATE OF CORRECTION

PATENT NO. : 4,826,827

DATED : May 2, 1989

INVENTOR(S) : Jean-Claude LORMEAU et al.

It is certified that error appears in the above-identified patent and that said Letters Patent is hereby corrected as shown below:

Title page, item [63] should read:

--Continuation of Ser. No. 373,016, Apr. 29, 1982, abandoned, which is a continuation-in-part of Ser. No. 194,544, Oct. 6, 1980, abandoned, which is a continuation-in-part of Ser. No. 204,505, Nov. 6, 1980, abandoned, which is a continuation of Ser. No. 091,164, Nov. 5, 1979, abandoned.--

UNITED STATES PATENT AND TRADEMARK OFFICE
CERTIFICATE OF CORRECTION

PATENT NO. : 4,826,827

DATED : May 2, 1989

INVENTOR(S) : Jean-Claude LORMEAU et al.

It is certified that error appears in the above-identified patent and that said Letters Patent is hereby corrected as shown below:

At column 1, lines 11 delete ", which is" and insert --and--.

On title page, item [30], Foreign Application Priority Data delete "0604" and insert --08604--, and insert

| | | | |
|---|---|---|---|
| --Nov. 6, 1978 | [FR] | France | 78 31357 |
| Jul. 20, 1979 | [FR] | France | 79 18873 |
| Oct. 5, 1979 | [GB] | Great Britain | 79 34673 |
| Jan. 7, 1980 | [GB] | Great Britain | 80 00443 |
| Jul. 2, 1980 | [GB] | Great Britain | 80 21749 |
| Jul. 2, 1980 | [GB] | Great Britain | 80 21750 |
| Sep. 15, 1980 | [GB] | Great Britain | 80 29697-- |

Signed and Sealed this

Fourteenth Day of September, 1993

*Attest:*

BRUCE LEHMAN

*Attesting Officer*     *Commissioner of Patents and Trademarks*